(12) United States Patent
Vikberg et al.

(10) Patent No.: US 8,600,390 B2
(45) Date of Patent: Dec. 3, 2013

(54) RETURNING USER EQUIPMENT TO A SOURCE RADIO ACCESS NETWORK

(75) Inventors: Jari Vikberg, Järna (SE); Tomas Hedberg, Stockholm (SE); Paul Schliwa-Bertling, Ljungsbro (SE)

(73) Assignee: Telefonaktiebolet L M Ericsson (publ), Stockholm (SE)

( * ) Notice: Subject to any disclaimer, the term of this patent is extended or adjusted under 35 U.S.C. 154(b) by 804 days.

(21) Appl. No.: 12/698,335

(22) Filed: Feb. 2, 2010

(65) Prior Publication Data

US 2011/0188468 A1     Aug. 4, 2011

(51) Int. Cl.
     *H04W 36/00*      (2009.01)
(52) U.S. Cl.
     USPC ........... 455/439; 455/436; 455/437; 455/438; 455/440; 455/441; 455/442; 455/443; 455/444
(58) Field of Classification Search
     USPC ................................................. 455/436–444
     See application file for complete search history.

(56) References Cited

U.S. PATENT DOCUMENTS

| | | | |
|---|---|---|---|
| 2009/0270096 A1* | 10/2009 | Somasundaram et al. ..... | 455/434 |
| 2010/0151863 A1 | 6/2010 | Kubo | |
| 2010/0167744 A1* | 7/2010 | Grob-Lipski et al. ........ | 455/436 |
| 2011/0092213 A1* | 4/2011 | Forsberg et al. .............. | 455/436 |
| 2011/0122780 A1* | 5/2011 | Nieminen et al. ............ | 370/252 |
| 2011/0261726 A1* | 10/2011 | Hakkinen et al. ............. | 370/259 |

FOREIGN PATENT DOCUMENTS

WO     WO 2010/146465 A1    12/2010

OTHER PUBLICATIONS

3GPP TS 23.272 V9.2.0 (Dec. 2009) Technical Specification "3rd Generation Partnership Project; Technical Specification Group Services and System Aspects; Circuit Switched Fallback in Evolved Packet System; Stage 2 (Release 9)", http://www.3gpp,org, 64 pages.
3GPP TS 23.401 V9.3.0 (Dec. 2009) Technical Specification "3rd Generation Partnership Project; Technical Specification Group Services and System Aspects; General Packet Radio Service (GPRS) enhancements for Evolved Universal Terrestrial Radio Access Network (E-UTRAN) access (Release 9)", http://www.3gpp.org, 254 pages.
3GPP TS 25.413 V9.1.0 (Dec. 2009) Technical Specification "3rd Generation Partnership Project; Technical Specification Group Radio Access Network; UTRAN Iu interface Radio Access Network Application Part (RANAP) signalling (Release 9)", http://www.3gpp.org, 401 pages.

(Continued)

*Primary Examiner* — Patrick Edouard
*Assistant Examiner* — Matthew Genack
(74) *Attorney, Agent, or Firm* — Myers Bigel Sibley & Sajovec, P.A.

(57) ABSTRACT

A device receives a request for a service for a user equipment associated with a source radio access network, and establishes a connection with the user equipment via a circuit switched fallback procedure. The device also receives, from the source radio access network, information associated with one or more source cells, and provides the service to the user equipment through a target radio access network. The device further uses the information to select one of the one or more source cells for the user equipment to return after the service terminates, terminates the service, and returns the user equipment to the selected source cell.

19 Claims, 11 Drawing Sheets

(56) References Cited

OTHER PUBLICATIONS

3GPP TS 36.413 V9.1.0 (Dec. 2009) Technical Specification "3$^{rd}$ Generation Partnership Project; Technical Specification Group Radio Access Network; Evolved Universal Terrestrial Radio Access Network (E-UTRAN); S1 Application Protocol (S1AP) (Release 9)", http://www.3gpp.org, 236 pages.

3GPP TS 48.014 V9.0.0 (Dec. 2009) Technical Specification "3$^{rd}$ Generation Partnership Project; Technical Specification Group GSM/EDGE Radio Access Network; General Packet Radio Service (GPRS); Base Station System (BSS)—Serving GPRS Support Node (SGSN); BSS GPRS Protocol (BSSGP) (Release 9)", http://www.3gpp.org, 172 pages.

Notification of Transmittal of the International Preliminary Report on Patentability, PCT Application No. PCT/SE2011/050014, Feb. 22, 2012.

3GPP, "3GPP TS 25.331 V9.0.0; 3$^{rd}$ Generation Partnership Project; Technical Specification Group Radio Access Network; Radio Resource Control (RRC); Protocol Specification (Release 9)", vol. 25.331, No. V9.0.0, pp. 519-520, Sep. 1, 2009.

International Search Report and Written Opinion of the International Searching Authority, PCT Application No. PCT/SE2011/050014, Apr. 28, 2011.

3GPP, "3$^{rd}$ Generation Partnership Project; Technical Specification Group Services and Systems Aspects; Circuit Switched Fallback in Evolved Packet System; Stage 2 (Release 9)", No. V9.2.0, pp. 1-64, Dec. 10, 2009.

Holma et al., "The Radio Resource Control Protocol", *WCDMA for UMTS: Radio Access for Third Generation Mobile Communications*, John Wiley & Sons, pp. 135-151, Jan. 1, 2001.

3GPP, "3GPP TS 25.331 V9.0.0; 3$^{rd}$ Generation Partnership Project; Technical Specification Group Radio Access Network; Radio Resource Control (RRC); Protocol Specification (Release 9)", vol. 25.331, No. V9.9.0, pp. 519-520, Sep. 1, 2009.

Research in Motion UK, Ltd., "GERAN LTE Interworking Issues With Legacy Systems", 3GPP TSG GERAN 42, vol. TDOC GP-090887, No. 42, pp. 1-3, May 11, 2009.

\* cited by examiner

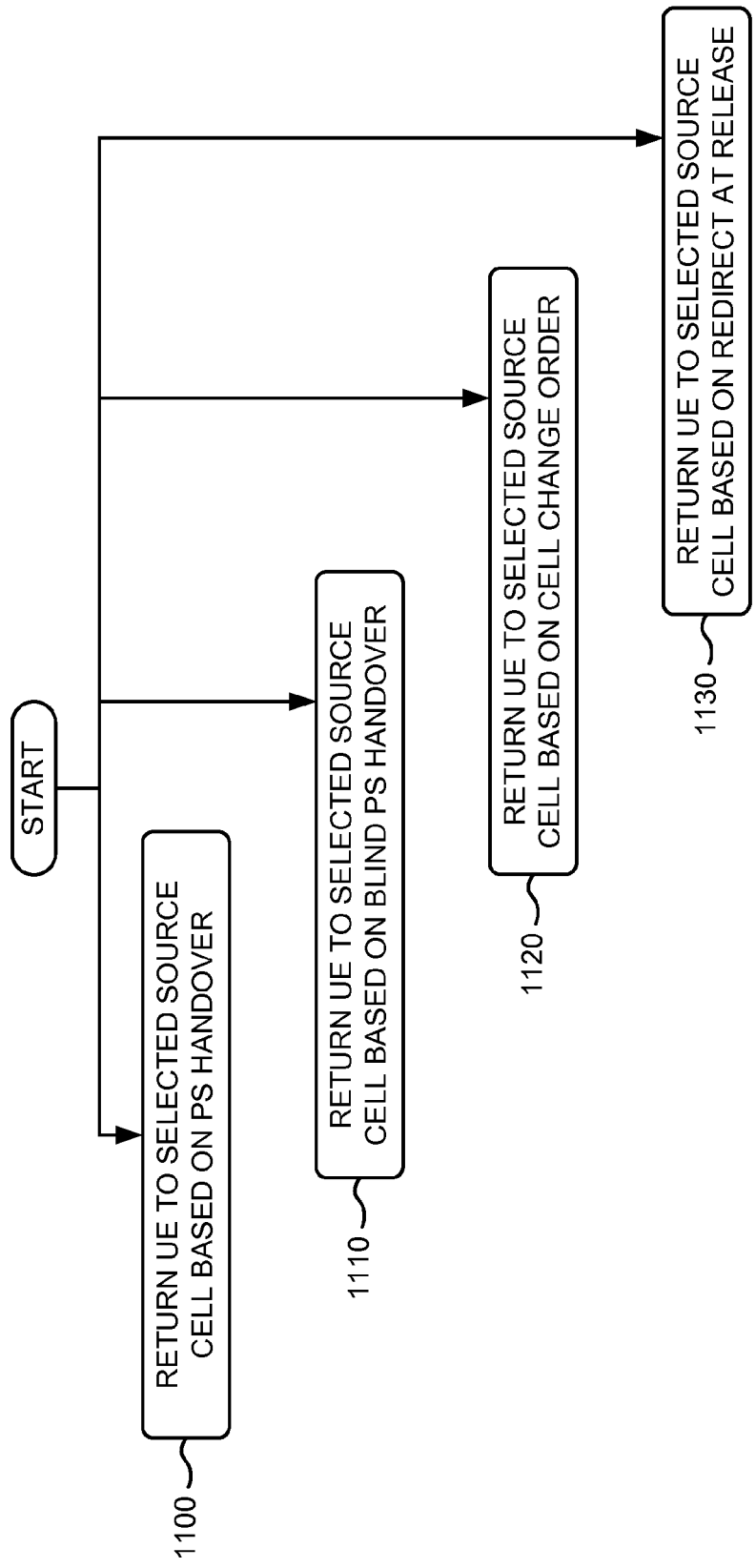

RETURNING USER EQUIPMENT TO A SOURCE RADIO ACCESS NETWORK

TECHNICAL FIELD

Embodiments described herein relate generally to communication systems, and, more particularly, to returning user equipment (UEs), in a telecommunication system, to a source radio access network.

BACKGROUND

Mobile circuit switched (CS) services based on Global System for Mobile communications (GSM) and Wideband Code Division Multiple Access (WCDMA) radio access networks (RANs) provide telecommunication services with a single subscription in almost all countries of the world. Today, the number of CS subscribers is still growing due to the provision of mobile CS services in countries, such as India and China, and due to the evolution of the mobile switching center (MSC) architecture into a softswitch solution that permits using packet transport infrastructure for mobile CS services.

The 3rd Generation Partnership Project (3GPP) has completed work (e.g., associated with UMTS Terrestrial Radio Access Networks (UTRANs) and Evolved UTRANs (E-UTRANs)) that defines a Long Term Evolution (LTE) concept that assures competitiveness of 3GPP-based radio access network technology. In parallel with the LTE concept, the 3GPP has also completed work associated with System Architecture Evolution (SAE) core networks. Only a packet switched (PS) domain (e.g., via which all services are supported) has been specified for LTE and SAE networks. However, GSM and WCDMA networks provide both PS and CS access simultaneously.

If telephony services are deployed over a LTE radio access network, an Internet Protocol (IP) Multimedia Subsystem (IMS)-based service engine is required. It has been investigated how to use LTE/SAE as access networks for existing CS core networks. The solutions to the investigation are referred to as "CS over LTE" solutions. The "CS over LTE" solutions provide a Packet MSC (PMSC) (e.g., in the CS core network) that serves both 2G and 3G radio access networks. The PMSC includes two new logical functions: (1) a Packet CS Controller (PCSC) that is used for control plane signaling; and (2) an Interworking Unit (IWU) that is used for user plane signaling. In the "CS over LTE" solutions, communication between user equipment and the PMSC is based on a SGi interface. This means that all direct communication between the user equipment and the PCSC and the IWU (e.g., provided in the PMSC) is based on IP protocols and that the user equipment is visible and reachable using an IP-address (e.g., via a packet data network (PDN) gateway (GW)).

However, none of the "CS over LTE" solutions have been standardized by the 3GPP. Instead, a solution called "CS fallback" has been standardized by the 3GPP. The main principle of "CS fallback" is that the user equipment is performing normal SAE mobility management procedures towards a mobility management entity (MME) while camping on a LTE radio access network. The MME registers the user equipment in a MSC server for CS based services using a SGs interface. When a request for CS services is received by the MSC server, the MSC server forwards the request to the user equipment via the MME (e.g., using the SGs interface) and the user equipment performs a CS fallback to a GSM EDGE Radio Access Network (GERAN) or a UTRAN and responds to request via the selected RAN. Similar behavior applies for mobile originated CS services. When mobile originated CS services are triggered and the user equipment is camping on a LTE radio access network (e.g., an E-UTRAN), the user equipment performs a CS fallback to a GERAN or a UTRAN and triggers initiation of the CS service via the selected RAN. Different solutions have been proposed for the "CS fallback" mechanism, such as a PS handover and an inter-RAN cell change order. Once the user equipment is finished with the CS service, the user equipment returns back to the LTE radio access network (e.g., to the E-UTRAN) using existing mechanisms. Unfortunately, the existing mechanisms used to move the user equipment back to the E-UTRAN (e.g., after CS fallback) are too slow, which may result in a bad experience for a user of the user equipment (e.g., poor transmission quality, dropped calls, etc.).

SUMMARY

It is an object of the invention to overcome at least some of the above disadvantages, and to provide systems and/or methods for returning user equipment to a source radio access network (e.g., to an E-UTRAN) after receiving a service (e.g., a CS service) via a target radio access network (e.g., via a GERAN or a UTRAN).

An embodiment described herein may provide a method in a target radio access network that includes a device. The method may include receiving, by the device, a request for a service for a user equipment associated with a particular source cell of a source radio access network, and connecting, by the device, with the user equipment via a handover procedure. The method may also include receiving, by the device and from the source radio access network, information associated with one or more source cells that include the particular source cell, and providing, by the device, the service to the user equipment via the target radio access network. The method may further include using, by the device, the information to select one of the one or more source cells for the user equipment to return after the service terminates, terminating the service, and returning, by the device, the user equipment to the selected source cell.

Another embodiment described herein may provide a device in a target radio access network. The device may include a memory to store a plurality of instructions, and a processor to execute instructions in the memory to receive a request for a service for a user equipment associated with a source radio access network, and establish a connection with the user equipment via a circuit switched fallback procedure. The processor may also execute instructions in the memory to receive, from the source radio access network, information associated with one or more source cells, and provide the service to the user equipment through the target radio access network. The processor may further execute instructions in the memory to use the information to select one of the one or more source cells for the user equipment to return after the service terminates, terminate the service, and return the user equipment to the selected source cell.

Still another embodiment described herein may provide a method in a target radio access network that includes a device. The method may include receiving, by the device and from a source radio access network connected to a user equipment, a request for supported functions associated with the target radio access network, and determining, by the device, whether the supported functions are provided by the target radio access network. The method may also include providing, by the device and to the source radio access network, configuration data associated with the supported functions when the supported functions are provided by the target radio access network. The method may further include connecting, by the device, with the user equipment based on the configuration data and when the supported functions are provided by the target radio access network.

Systems and/or methods described herein may enable a source radio access network (e.g., a E-UTRAN) to provide information about a source E-UTRAN cell to a target radio access network (e.g., either a GERAN or a UTRAN) during a PS handover preparation phase for CS fallback. The target radio access network (e.g., based on the received information) may use the source cell as a first candidate for moving user equipment back to the E-UTRAN after a CS service terminates in the GERAN or UTRAN. The user equipment may move back to the E-UTRAN based on, for example, a PS handover, a blind PS handover, a Cell Change Order (CCO), or a redirect at release. The GERAN or UTRAN may select a cell from the E-UTRAN (e.g., for the user equipment) to which the user equipment may return after the CS service terminates. The received information about the source (e.g., the E-UTRAN) cell may include information necessary for the GERAN or UTRAN to trigger the PS handover, the blind PS handover, and/or the CCO.

In an exemplary embodiment, the systems and/or methods described herein may also be applied to a normal PS handover between a source radio access network (e.g., an E-UTRAN) and a target radio access network (e.g., a GERAN or a UTRAN) without CS fallback. In such an arrangement, the target radio access network may determine cell relations (e.g., associated with the source radio access network) based on information received from the source radio access network.

In addition, the systems and/or methods described herein may enable the target radio access network (e.g., the GERAN or UTRAN) to build source to neighbor cell relations that may be used if the user equipment has physically moved in the GERAN or UTRAN during the CS service or if radio conditions have changed in such a way that another E-UTRAN cell should be selected for the user equipment. Such an approach may be beneficial during initial deployment of LTE networks, where new LTE sites may be continuously added. The systems and/or methods described herein may provide mechanisms that avoid considerable operations and maintenance (O&M) (e.g., in the GERAN or UTRAN) required to update the GERAN/UTRAN and neighboring cell relationships. Furthermore, the systems and/or methods described herein may move the user equipment back to the E-UTRAN (e.g., after CS fallback) much quicker than existing mechanisms, which may result in a good experience for a user of the user equipment.

BRIEF DESCRIPTION OF THE DRAWINGS

FIGS. 7-11 are flow charts of an exemplary process for returning user equipment to a source radio access network after receiving a service via a target radio access network according to embodiments described herein.

DETAILED DESCRIPTION

The following detailed description refers to the accompanying drawings. The same reference numbers in different drawings may identify the same or similar elements. Also, the following detailed description does not limit the invention.

Figure 1:
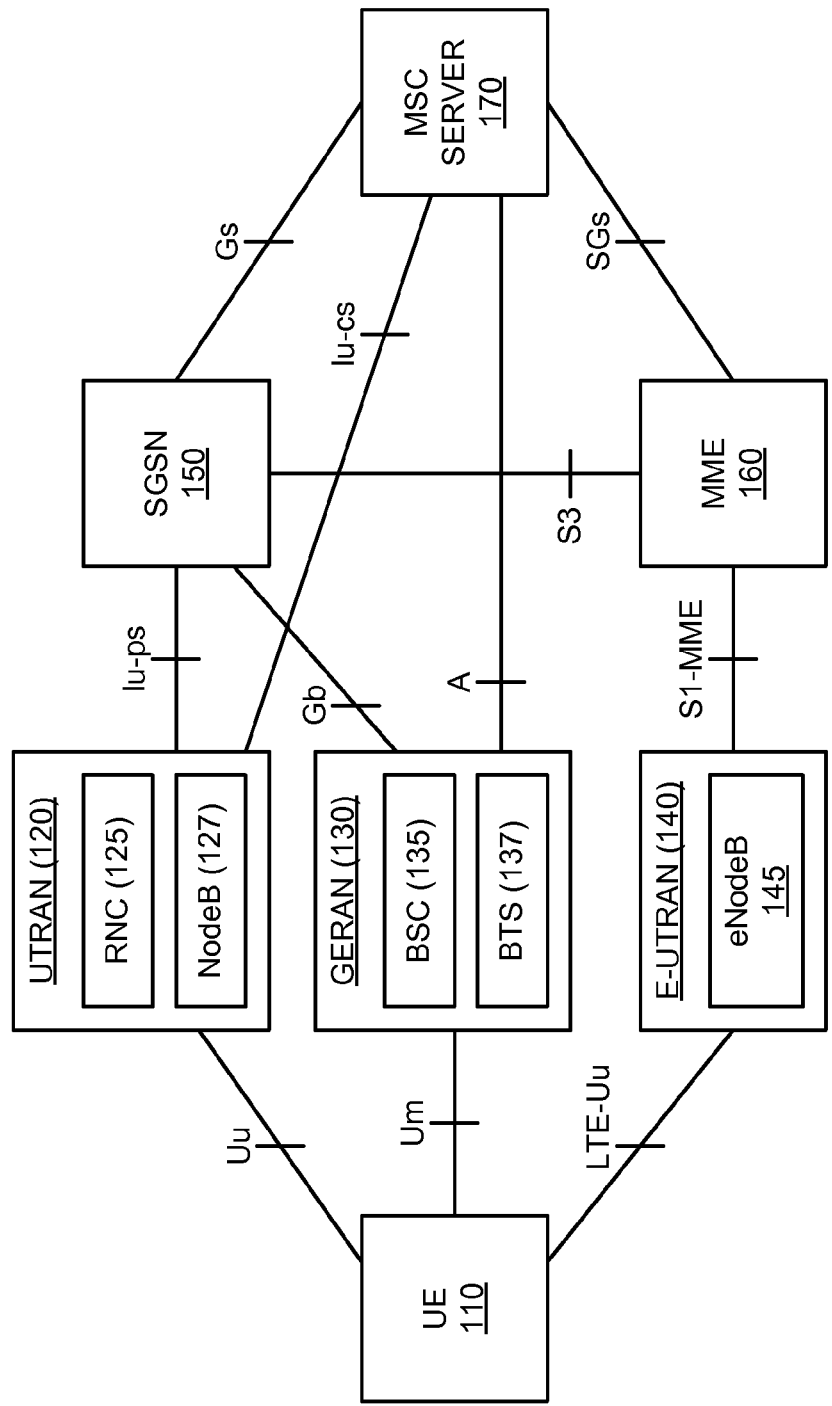
FIG. 1 is a diagram of an exemplary network in which systems and/or methods described herein may be implemented.

FIG. 1 depicts a diagram of an exemplary network 100 in which systems and/or methods described herein may be implemented. As shown, network 100 may include a user equipment (UE) 110, a UTRAN 120 (that includes a RNC 125 and a NodeB 127), a GERAN 130 (that includes a base station controller (BSC) 135 and a base transceiver station (BTS) 137), an E-UTRAN 140 (that includes an eNodeB 145), a serving General Packet Radio Service (GPRS) support node (SGSN) 150, a MME 160, and a MSC server 170. A single UE 110, UTRAN 120, RNC 125, NodeB 127, GERAN 130, BSC 135, BTS 137, E-UTRAN 140, eNodeB 145, SGSN 150, MME 160, and MSC server 170 have been illustrated in FIG. 1 for simplicity. In practice, there may be more UEs 110, UTRANs 120, RNCs 125, NodeBs 127, GERANs 130, BSCs 135, BTSs 137, E-UTRANs 140, eNodeBs 145, SGSNs 150, MMEs 160, and MSC servers 170. Also, in some instances, one or more of the components of network 100 may perform one or more functions described as being performed by another one or more of the components of network 100.

As further shown in FIG. 1, components of network 100 may interconnect via a variety of interfaces. For example, UE 110 may interconnect with UTRAN 120 via a Uu interface, may interconnect with GERAN 130 via a Um interface, and may interconnect with E-UTRAN 140 via a LTE-Uu interface. UTRAN 120 may interconnect with SGSN 150 via an Iu-ps interface and may interconnect with MSC server 170 via an Iu-cs interface. GERAN 130 may interconnect with SGSN 150 via a Gb interface and may interconnect with MSC server 170 via an A interface. E-UTRAN 140 may interconnect with MME 160 via a S1-MME interface. SGSN 150 may interconnect with MME 160 via a S3 interface and may interconnect with MSC server 170 via a Gs interface. MME 160 may interconnect with MSC server 170 via a SGs interface.

UE 110 may include one or more computation and/or communication devices capable of sending/receiving voice and/or data to/from UTRAN 120, GERAN 130, and/or E-UTRAN 140. UE 110 may include, for example, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, etc.

UTRAN 120 may include a radio access network that is provided via a collection of RNCs (e.g., RNC 125) and NodeBs (e.g., NodeB 127). UTRAN 120 (e.g., also known as a 3G network) may carry many traffic types from real-time circuit switched traffic to IP based packet switched traffic. UTRAN 120 may permit connectivity between UE 110 and a core network (not shown).

RNC 125 may include one or more devices that control and manage base stations (e.g., NodeB 127). RNC 125 may also include devices that perform data processing to manage utilization of radio network services. RNC 125 may transmit/ receive voice and data to/from NodeB 127, other RNCs, and/or a core network. RNC 125 may act as a controlling radio network controller (CRNC), a drift radio network controller (DRNC), or a serving radio network controller (SRNC). A CRNC may be responsible for controlling the resources of a base station. On the other hand, an SRNC may serve particular UEs 110 and may manage connections towards those UEs 110. Likewise, a DRNC may fulfill a similar role to the SRNC (e.g., may route traffic between a SRNC and a particular UE 110).

NodeB 127 may include one or more devices that receive voice and/or data from RNC 125 and transmit that voice and/or data to UE 110 via an air interface. NodeB 127 may also include one or more devices that receive voice and/or data from UE 110 over an air interface and transmit that voice and/or data to RNC 125 or other UEs 110. Although FIG. 1 shows RNC 125 and NodeB 127 as separate devices, in other embodiments RNC 125 and Node B 127 may be the same device. If separate devices, a logical interface (e.g., an Iub interface) may be provided between RNC 125 and NodeB 127.

GERAN 130 may include a radio access network provided via a collection of BSCs (e.g., BSC 135) and BTSs (e.g., BTS 137). GERAN 130 may carry many traffic types from real-time circuit switched traffic to IP based packet switched traffic. GERAN 130 may permit connectivity between UE 110 and a core network (not shown).

BSC 135 may include one or more devices that control and manage BTSs (e.g., BTS 137). BSC 135 may also include devices that perform data processing to manage utilization of radio network services. BSC 135 may transmit/receive voice and data to/from BTS 137, other BSCs, and/or a core network. BSC 135 may provide intelligence behind BTSs. For example, BSC 135 may handle allocation of radio channels, may receive measurements from UE 110, may control handovers from BTS to BTS, etc.

BTS 137 may include one or more devices that receive voice and/or data from BSC 135 and transmit that voice and/or data to UE 110 via an air interface. BTS 137 may also include one or more devices that receive voice and/or data from UE 110 over an air interface and transmit that voice and/or data to BSC 135 or other UEs 110. Although FIG. 1 shows BSC 135 and BTS 137 as separate devices, in other embodiments BSC 135 and BTS 137 may be the same device.

E-UTRAN 140 may include a radio access network provided via a collection of eNodeBs (e.g., eNodeB 145). E-UTRAN 140 may carry many traffic types, such as, for example, IP based packet switched traffic. E-UTRAN 140 may permit connectivity between UE 110 and a core network (not shown).

eNodeB 145 may include one or more devices that receive voice and/or data from a serving gateway and transmit that voice and/or data to UE 110 via an air interface. eNodeB 145 may also include one or more devices that receive voice and/or data from UE 110 over an air interface and transmit that voice and/or data to the serving gateway.

SGSN 150 may include one or more computation and/or communication devices that are responsible for delivery of data packets to and from UEs 110 within its geographical service area. SGSN 150 may provide packet routing, mobility management, logical link management, authentication and charging functions, etc. SGSN 150 may include a location register that stores location information (e.g., a current cell) and user profiles of users registered with SGSN 150.

MME 160 may include one or more computation and/or communication devices that control and manage eNodeBs (e.g. eNodeB 145). MME 160 may perform one or more of the following functions: Non-access stratum (NAS) signaling; NAS signaling security; security control; inter-core network signaling for mobility between 3GPP access networks; idle mode UE reachability; tracking area list management (for UEs 110 in idle and active modes); SGSN 150 selection for handovers to 3GPP access networks; roaming; authentication; bearer management functions; etc.

MSC server 170 may include one or more computation and/or communication devices that are responsible for handling voice calls and short message service (SMS) as well as other services (e.g., circuit switched data). MSC server 170 may set up and release an end-to-end connection, may handle mobility and hand-over requirements during a call, may handle charging and real time pre-paid account monitoring, etc.

Although FIG. 1 shows exemplary components of network 100, in other embodiments, network 100 may include fewer components, different components, differently arranged components, or additional components than depicted in FIG. 1.

Figure 2:
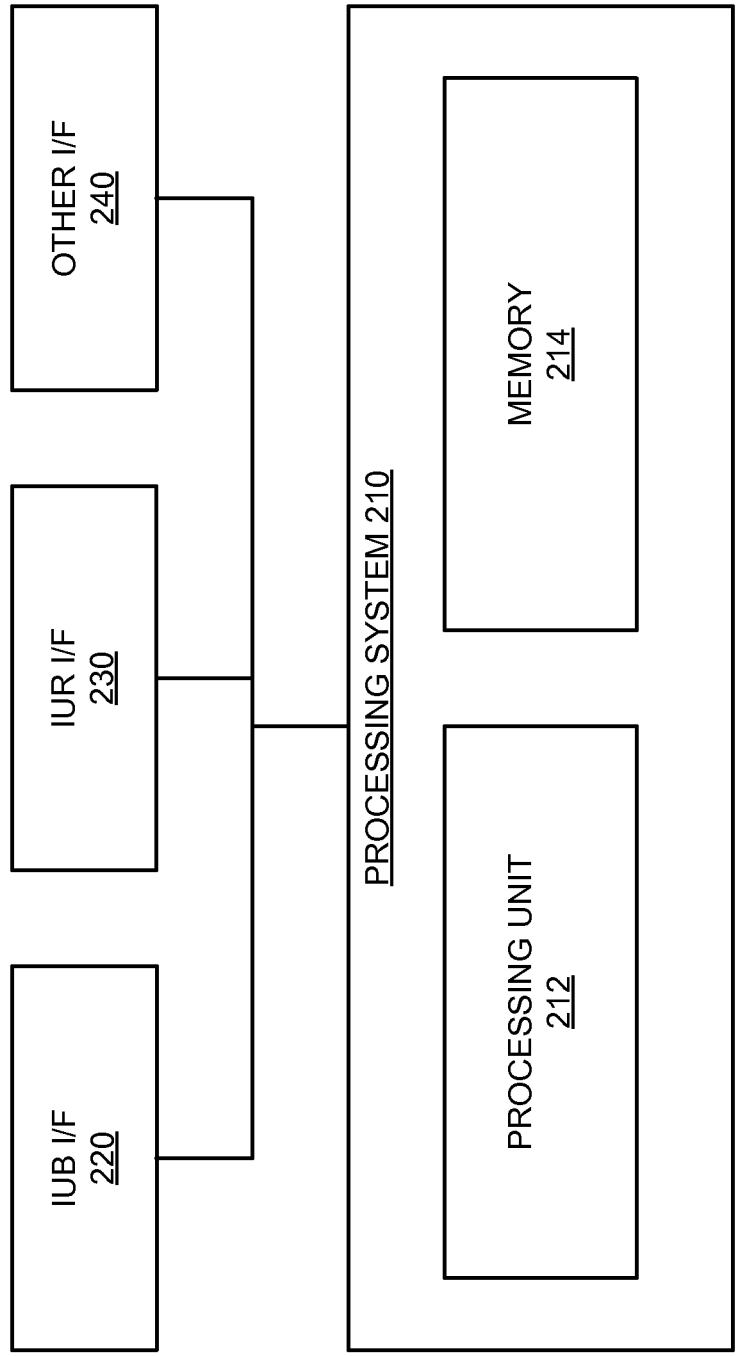
FIG. 2 is a diagram of exemplary components of a radio network controller (RNC) of a UTRAN depicted in FIG. 1.

FIG. 2 is a diagram of exemplary components of RNC 125. BSC 135 may include similar components and may be similarly arranged. As shown in FIG. 2, RNC 125 may include a processing system 210, an Iub interface 220, an Iur interface 230, and/or other interfaces 240.

Processing system 210 may control the operation of RNC 125. As illustrated, processing system 210 may include a processing unit 212 and a memory 214. Processing unit 212 may handle protocol exchanges between Iub interface 220, Iur interface 230, and other interfaces 240. In addition, processing unit 212 may generate control messages and/or data messages and transmit those control messages and/or data messages via interfaces 220-240. Processing unit 212 may also process control messages and/or data messages received from interfaces 220-240. In one embodiment, processing unit 212 may include one or more processors, microprocessors, application specific integrated circuits (ASICs), field programmable gate arrays (FPGAs), or the like. Memory 214 may include a random access memory (RAM), a read-only memory (ROM), and/or another type of memory to store data and instructions that may be used by processing unit 212.

Iub interface 220 may include one or more line cards that allow RNC 125 to transmit control messages and/or data messages to and receive control messages and/or data messages from NodeB 127. Iur interface 230 may include one or more line cards that allow RNC 125 to transmit control messages and/or data messages to and receive control messages and/or data messages from another RNC. Other interfaces 240 may include interfaces to other devices and/or networks. For example, other interfaces 240 may include an Iu-cs interface, which is a core network interface to a circuit-switched voice network, and an Iu-ps interface, which is a core network interface to a packet-switched data network.

As described herein, RNC 125 may perform certain operations in response to processing unit 212 executing software instructions of an application contained in a computer-readable medium, such as memory 214. A computer-readable medium may be defined as a physical or logical memory device. A logical memory device may include memory space within a single physical memory device or spread across multiple physical memory devices. The software instructions may be read into memory 214 from another computer-readable medium or from another device. The software instructions contained in memory 214 may cause processing unit 212 to perform processes described herein. Alternatively, hardwired circuitry may be used in place of or in combination with software instructions to implement processes described herein. Thus, embodiments described herein are not limited to any specific combination of hardware circuitry and software.

Although FIG. 2 shows exemplary components of RNC 125, in other embodiments, RNC 125 may contain fewer components, different components, differently arranged components, or additional components than depicted in FIG. 2. Additionally or alternatively, one or more components of RNC 125 may perform one or more other tasks described as being performed by one or more other components of RNC 125.

Figure 3:
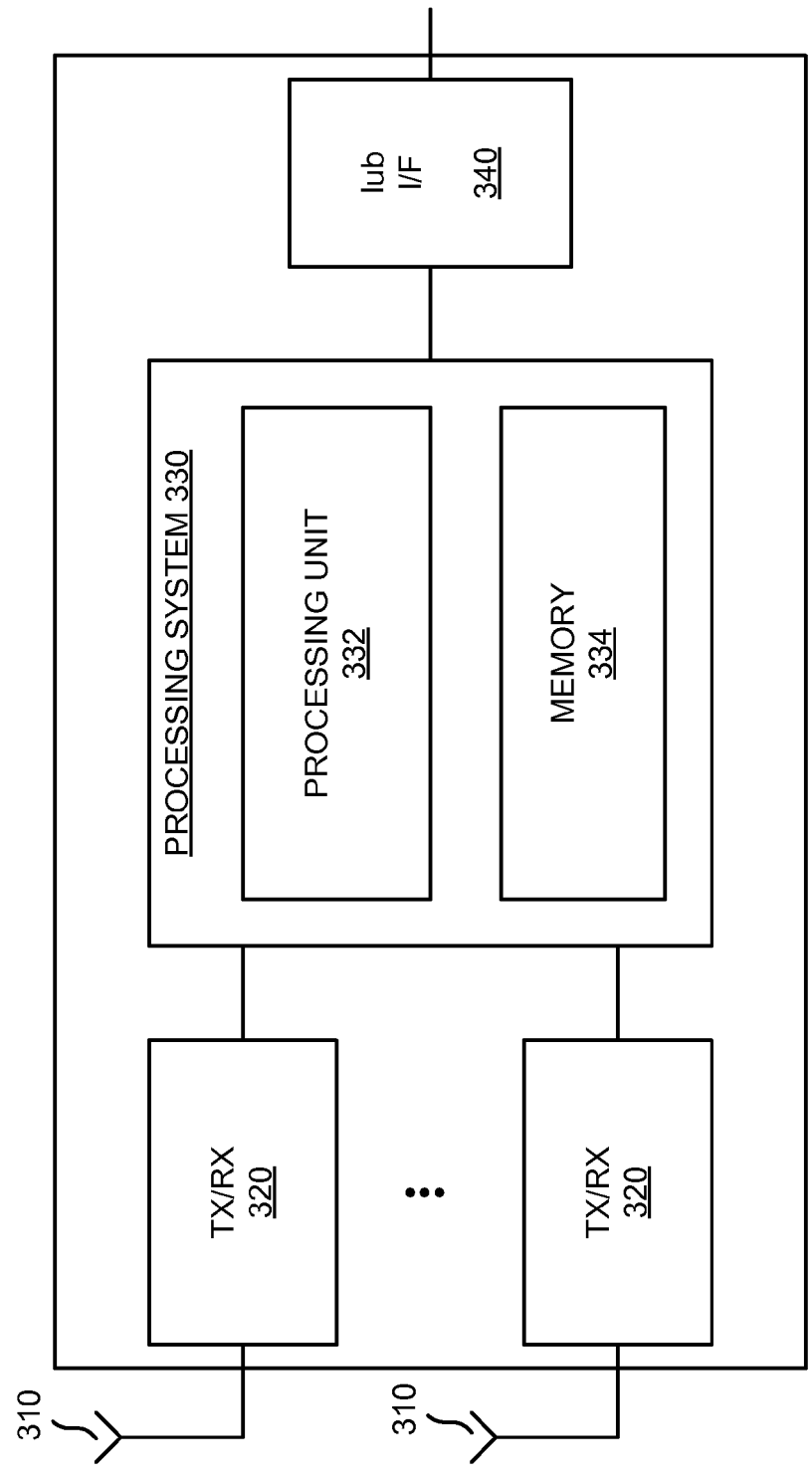
FIG. 3 is a diagram of exemplary components of a base station (NodeB) of the UTRAN depicted in FIG. 1.

FIG. 3 is a diagram of exemplary components of NodeB 127. Each of BTS 137 and/or eNodeB 145 may include similar components and may be similarly arranged. As shown in FIG. 3, NodeB 127 may include antennas 310, transceivers (TX/RX) 320, a processing system 330, and an Iub interface (I/F) 340.

Antennas 310 may include one or more directional and/or omni-directional antennas. Transceivers 320 may be associated with antennas 310 and may include transceiver circuitry for transmitting and/or receiving symbol sequences in a network, such as network 100, via antennas 310.

Processing system 330 may control the operation of NodeB 127. Processing system 330 may also process information received via transceivers 320 and Iub interface 340. Processing system 330 may further measure quality and strength of a connection, may determine the distance to UEs 110, and may transmit this information to RNC 125. As illustrated, processing system 330 may include a processing unit 332 and a memory 334.

Processing unit 332 may include one or more processors, microprocessors, ASICs, FPGAs, or the like. Processing unit 332 may process information received via transceivers 320 and Iub interface 340. The processing may include, for example, data conversion, forward error correction (FEC), rate adaptation, Wideband Code Division Multiple Access (WCDMA) spreading/dispreading, quadrature phase shift keying (QPSK) modulation, etc. In addition, processing unit 332 may transmit control messages and/or data messages, and may cause those control messages and/or data messages to be transmitted via transceivers 320 and/or Iub interface 340. Processing unit 332 may also process control messages and/or data messages received from transceivers 320 and/or Iub interface 340.

Memory 334 may include a RAM, a ROM, and/or another type of memory to store data and instructions that may be used by processing unit 332.

Iub interface 340 may include one or more line cards that allow NodeB 127 to transmit data to and receive data from RNC 125 and other devices in network 100.

As described herein, NodeB 127 may perform certain operations in response to processing unit 332 executing software instructions of an application contained in a computer-readable medium, such as memory 334. The software instructions may be read into memory 334 from another computer-readable medium or from another device via antennas 310 and transceivers 320. The software instructions contained in memory 334 may cause processing unit 332 to perform processes described herein. Alternatively, hardwired circuitry may be used in place of or in combination with software instructions to implement processes described herein. Thus, embodiments described herein are not limited to any specific combination of hardware circuitry and software.

Although FIG. 3 shows exemplary components of NodeB 127, in other embodiments, NodeB 127 may contain fewer components, different components, differently arranged components, or additional components than depicted in FIG. 3. Additionally or alternatively, one or more components of NodeB 127 may perform one or more other tasks described as being performed by one or more other components of NodeB 127.

Figure 4:
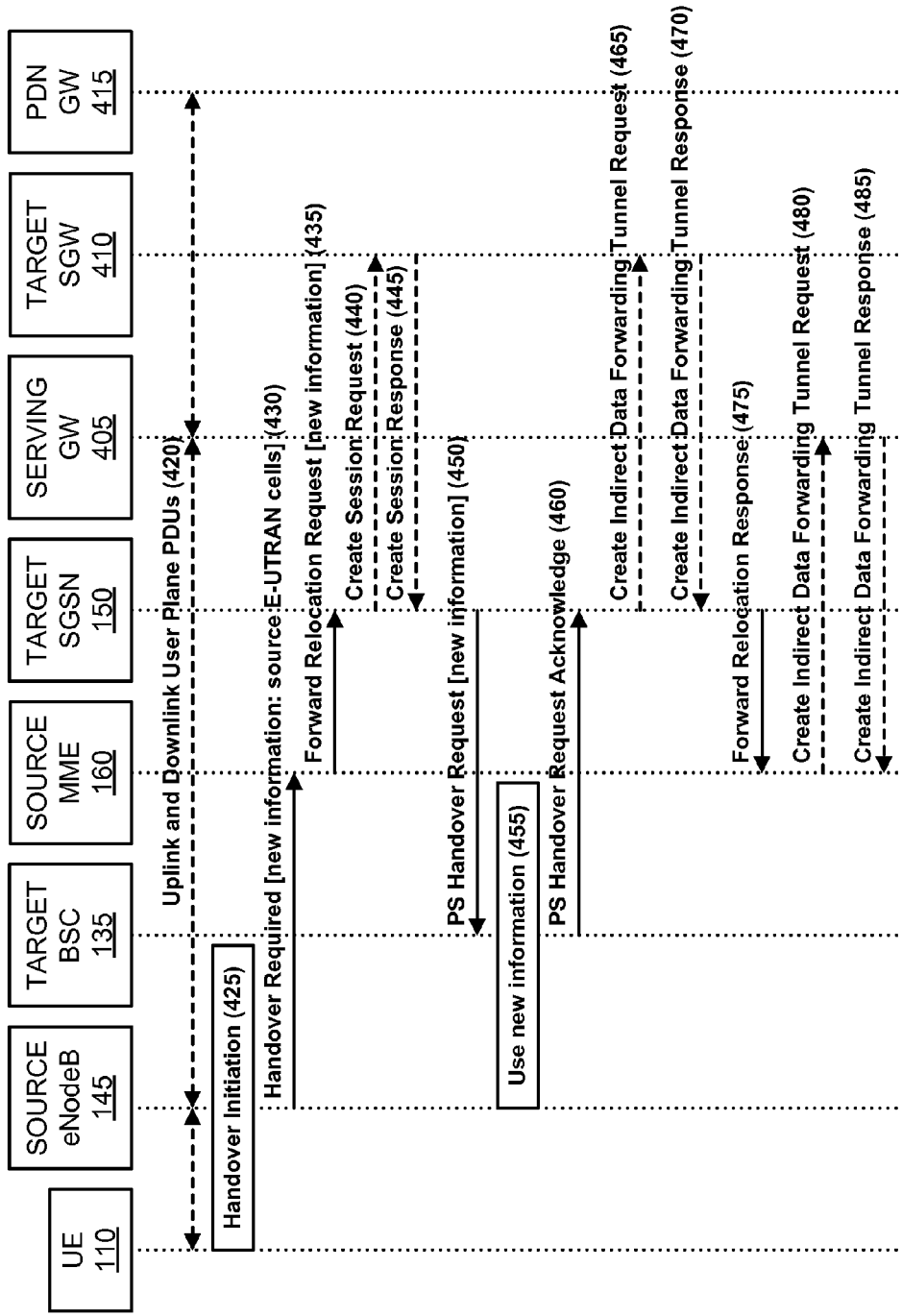
FIG. 4 is a diagram of exemplary interactions among components of an exemplary network during a modified PS handover preparation phase from a E-UTRAN to a GERAN.

FIG. 4 is a diagram of exemplary interactions among components of an exemplary network 400 during a modified PS handover preparation phase from E-UTRAN 140 (e.g., a source radio access network) to GERAN 130 (e.g., a target radio access network). As shown in FIG. 4, network 400 may include UE 110, BSC 135, eNodeB 145, SGSN 150, MME 160, a serving gateway (GW) 405, a target serving gateway (SGW) 410, and a packet data network (PDN) gateway (GW) 415. UE 110, BSC 135, eNodeB 145, SGSN 150, and MME 160 may include the features described above in connection with one or more of FIGS. 1-3.

Serving GW 405 may include one or more computation and/or communication devices that route and forward packet data units (PDUs) to/from eNodeBs (e.g., eNodeB 145), MME 160, and/or PDN GW 415, act as a mobility anchor for the user plane during inter-eNodeB handovers, and act as an anchor for mobility between LTE and other 3GPP technologies.

Target serving GW 410 may include one or more computation and/or communication devices that route and forward information to/from SGSN 150.

PDN GW 415 may include one or more computation and/or communication devices that provide connectivity between UE 110 and external packet data networks. PDN GW 415 may act as a point of entry and exit for traffic to UE 110, may control IP data services, may perform routing, may allocate IP addresses, may provide access for non-3GPP access networks, and may enforce policies.

In an exemplary embodiment, FIG. 4 may depict how a PS handover preparation phase is modified when PS handover is used as the CS fallback mechanism to move UE 110 to either UTRAN 120 or GERAN 130. In FIG. 4, GERAN 130 (e.g., BSC 135) is used as the exemplary target radio access network. However, the same principles may apply when UTRAN 120 is used as the exemplary target radio access network.

As further shown in FIG. 4, uplink and downlink user plane packet data units (PDUs) may be exchanged among UE 110, eNodeB 145, serving GW 405, and PDN GW 415, as indicated by reference number 420. While associated with a source radio access network (e.g., E-UTRAN 140), eNodeB 145 may initiate a handover of UE 110, as indicated by reference number 425, in order to receive a service (e.g., a CS service) associated with a target radio access network (e.g., UTRAN 120 or GERAN 130). Source eNodeB 145 may add new information about one or more source E-UTRAN 140 cells to a handover required message 430, and may provide handover required message 430 to source MME 160. The new information (e.g., about source E-UTRAN 140 cell(s)) may be transported transparently to a target radio access network (e.g., to BSC 135 of GERAN 130), and may be included in RAN transparent containers. The RAN transparent containers may include specific information elements (IEs) that are transported unmodified between a source radio access network (e.g., E-UTRAN 140) and a target radio access network (e.g., GERAN 130). Different information elements may be used depending on a selected target radio access network. For example, if the target radio access network is GERAN 130, a "Source Base Station Subsystem (BSS) to Target BSS Transparent Container" may be used for the information elements. If the target radio access network is UTRAN 120, a "Source RNC to Target RNC Transparent Container" may be used for the information elements.

In one exemplary embodiment, the new information (e.g., about source E-UTRAN 140 cell(s)) may include frequencies associated with the source E-UTRAN 140 cell(s), physical cell identities (PCIs) associated with the source E-UTRAN 140 cell(s), identification(s) of eNodeB(s) (e.g., an identification of eNodeB 145) serving the source E-UTRAN 140 cell(s), identification(s) of source E-UTRAN 140 cell(s) (e.g., a E-UTRAN Cell Global Identity), and tracking area identities (TAIs) associated with the source E-UTRAN 140 cell(s). Such new information may enable RNC 125 or BSC 135 to identify a source E-UTRAN 140 cell from possible measurement reports received from UE 110, and may enable routing of the PS handover back to E-UTRAN 140 after the service (e.g., the CS service) provided by UTRAN 120 or GERAN 130 terminates.

In another exemplary embodiment, if a source radio access network corresponds to a UTRAN (e.g., UTRAN 120), the new information (e.g., about source UTRAN 120 cell(s)) may include frequencies associated with the source UTRAN 120 cell(s), physical scrambling codes (PSCs) associated with the source UTRAN 120 cell(s), identification(s) of RNC(s) (e.g., an identification of RNC 125) serving the source UTRAN 120 cell(s), identification(s) of the source UTRAN 120 cell(s) (e.g., a UTRAN Cell Global Identity), and routing area identities (RAIs) associated with the source UTRAN 120 cell(s).

As further shown in FIG. 4, source MME 160 may provide a forward relocation request message 435 (e.g., that includes the new information) to target SGSN 150. Target SGSN 150 may provide a create session request message 440 to target SGW 410, and may receive a create session response message 445 from target SGW 410. Target SGSN 150 may provide a PS handover request message 450 (e.g., that includes the new information) to target BSC 135 (e.g., since GERAN 130 is the selected target radio access network). Target BSC 135 may use the new information, as indicated by reference number 455, and may provide a PS handover request acknowledge message 460 to target SGSN 150. Target SGSN 150 may provide a create indirect data forwarding tunnel request 465 to target SGW 410, and may receive a create indirect data forwarding tunnel response 470 from target SGW 410. Target SGSN 150 may then provide a forward relocation response 475 to source MME 160. Source MME 160 may provide a create indirect data forwarding tunnel request 480 to serving GW 405, and may receive a create indirect data forwarding tunnel response 485 from serving GW 405.

Although not shown in FIG. 4, in one exemplary embodiment, source eNodeB 145 may provide, to the target radio access network (e.g., GERAN 130), information about a procedure occurring due to the CS fallback, and the target radio access network may store this information in a UE 110 context. Further details of how the target radio access network (e.g., BSC 135 of GERAN 130) utilizes the new information (e.g., as indicated by reference number 455) is provided below in connection with FIG. 5.

Although FIG. 4 shows exemplary components of network 400, in other embodiments, network 400 may contain fewer components, different components, differently arranged components, or additional components than depicted in FIG. 4. Additionally or alternatively, one or more components of network 400 may perform one or more other tasks described as being performed by one or more other components of network 400.

Figure 5:
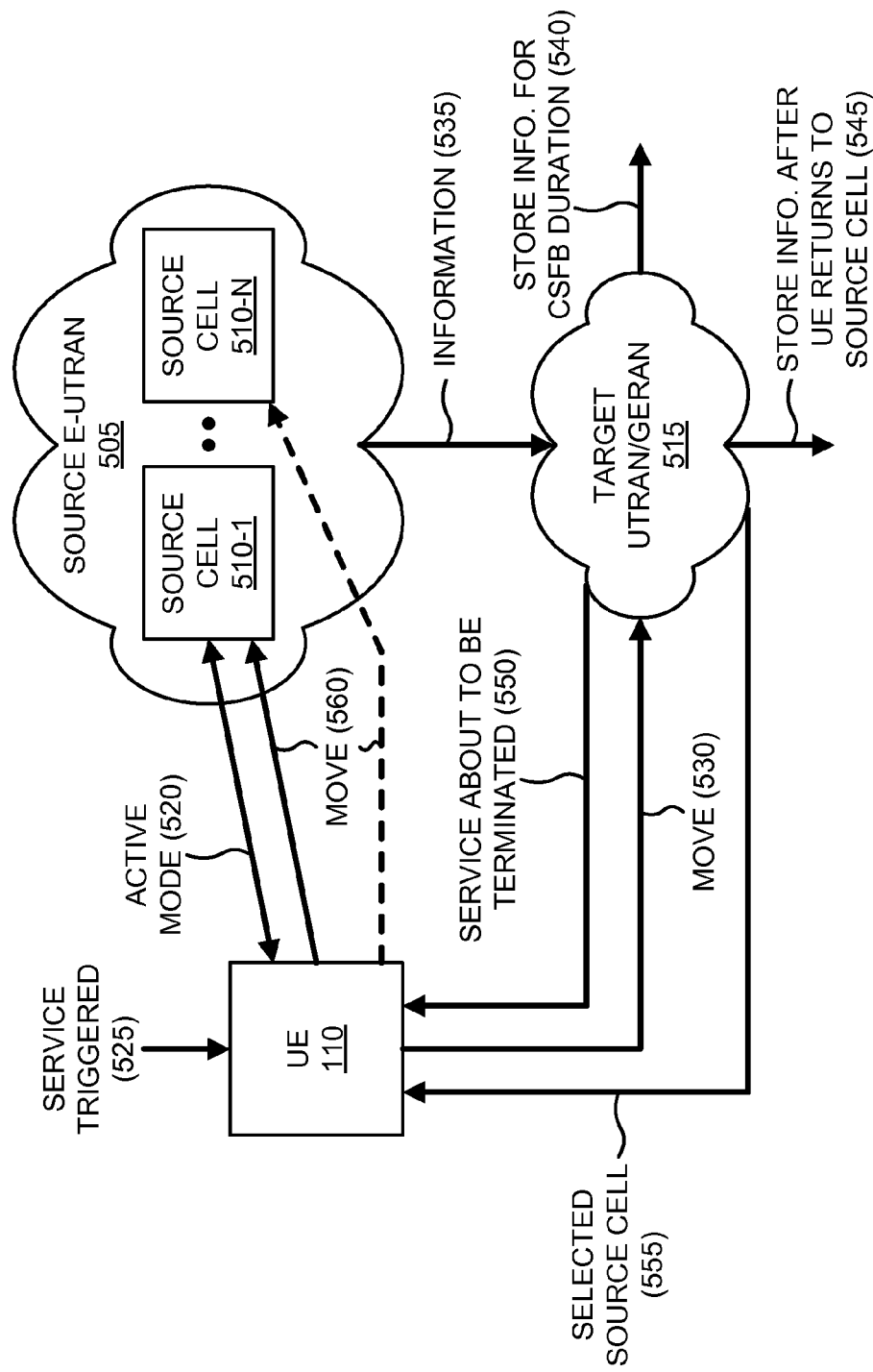
FIG. 5 is a diagram of exemplary interactions among components of another exemplary network.

FIG. 5 is a diagram of exemplary interactions among components of another exemplary network 500. As shown, network 500 may include UE 110, a source E-UTRAN 505 (that includes source cells 510-1 through 510-N), and a target UTRAN or GERAN 515. UE 110 may include the features described above in connection with FIGS. 1 and/or 4. Source E-UTRAN 505 may include the features described above in connection with a source radio access network (e.g., E-UTRAN 140). Each of source cells 510-1 through 510-N may include a radio cell served by at least one fixed-location transceiver (e.g., eNodeB 145) provided in source E-UTRAN 505. Target UTRAN/GERAN 515 may include the features described above in connection with a target radio access network (e.g., UTRAN 120 or GERAN 130).

As further shown in FIG. 5, UE 110 may be in an idle mode or in an active mode 520 (e.g., may be communicating) with a source cell (e.g., source cell 510-1) of source E-UTRAN 505, and a service (e.g., a CS service, such as a CS call) may be triggered for UE 110, as indicated by reference number 525. In one example, the triggered service may include a service provided by a target radio access network (e.g., target UTRAN/GERAN 515). Based on the triggered service, UE 110 may indicate a need for a CS service to eNodeB 145 which may trigger moving of UE 110 to target UTRAN/GERAN 515, and target UTRAN/GERAN 515 (e.g., RNC 125 or BSC 135) may receive the request to move UE 110. For example, as shown in FIG. 4, eNodeB 145 may initiate a PS handover (e.g., as indicated by reference number 425) to target BSC 135, and BSC 135 may receive a PS handover request message 450.

Returning to FIG. 5, UE 110 may move 530 to (e.g., connect with) target UTRAN/GERAN 515 via a PS handover as a CS fallback mechanism. For example, UE 110 may connect with BSC 135 via the PS handover as the CS fallback mechanism. When UE 110 moves to target UTRAN/GERAN 515, UE 110 may receive the CS service (e.g., a CS call may established with UE 110) via target UTRAN/GERAN 515. During (or via) the PS handover to target UTRAN/GERAN 515, source E-UTRAN 505 may provide information 535 to target UTRAN/GERAN 515. Information 535 may include the new information (e.g., about source E-UTRAN 140 cell(s)) described above in connection with FIG. 4. In one exemplary embodiment, information 535 may include frequencies associated with source cells 510-1 through 510-N, physical cell identities (PCIs) associated with source cells 510-1 through 510-N, identifications of eNodeBs (e.g., eNB-ID of eNodeB 145) serving source cells 510-1 through 510-N, identification(s) of source cells 510-1 through 510-N (e.g., a E-UTRAN Cell Global Identity), and tracking area identities (TAIs) associated with source cells 510-1 through 510-N.

Target UTRAN/GERAN 515 may use information 535 in a variety of different ways. In one example, target UTRAN/GERAN 515 may store information 535 in a UE 110 context. In this case, target UTRAN/GERAN 515 may store information 535 only for a duration of the CS fallback procedure (e.g., as indicated by reference number 540), and may delete information 535 after UE 110 has returned to source E-UTRAN 505. This approach may work when UE 110 does not physically move a lot in target UTRAN/GERAN 515 during provision of the CS service since one of source cells 510-1 through 510-N may still be a viable source E-UTRAN 505 cell to which UE 110 may return.

However, if UE 110 physically moves around a lot (e.g., between BSCs or RNCs) in target UTRAN/GERAN 515 during provision of the CS service, information 535 may become outdated. To handle such a situation, target UTRAN/GERAN 515 may store information 535 associated with neighboring source cells (e.g., neighbor cells to source cells 510-1 through 510-N). In this case, information 535 may be stored more permanently (e.g., to be maintained also after the duration of the CS fallback procedure, after UE 110 has returned to source E-UTRAN 505, etc.) in target UTRAN/

GERAN 515, as indicated by reference number 545. Such information 535 may be used by other UEs 110 when the other UEs 110 are to be returned to source E-UTRAN 505 from target UTRAN/GERAN 515. This approach may solve the problem of UE 110 physically moving during provision of the CS service. In one example, target UTRAN/GERAN 515 may store information associated with the neighboring source cells of source E-UTRAN 505 as neighbor cell relations for target UTRAN/GERAN 515. Such information may include a "cell type" indicator that may enable target UTRAN/GERAN 515 to estimate a validity time for the information (e.g., Femto cells may change PCIs dynamically). In one exemplary embodiment, if UE 110 physically moves around in target UTRAN/GERAN 515, information about the CS fallback procedure being in process may be forwarded between source cells and target UTRAN/GERAN 515.

When the CS Service is about to be terminated (e.g., as indicated by reference number 550), target UTRAN/GERAN 515 may use information 535 (e.g., about the CS fallback procedure being in process) to decide how to move UE 110 back to source E-UTRAN 505 as soon as possible. The information about the CS fallback procedure being in process may be stored in a UE 110 context in target UTRAN/GERAN 515. In one example, target UTRAN/GERAN 515 may use information 535 to select one of source cells 510-1 through 510-N for UE 110 to return after the CS service terminates, and may provide information 555 about the selected one of source cells 510-1 through 510-N to UE 110. Information 555 may direct UE 110 to move 560 to one of source cells 510-1 through 510-N. The CS service may terminate for UE 110, and UE 110 may return to the selected one of source cells 510-1 through 510-N. In one example, after target UTRAN/GERAN 515 has selected the source E-UTRAN 505 cell, a PS handover, a blind PS handover, a CCO, or a redirect at release procedure may be used to move UE 110 back to source E-UTRAN 505.

If dual transfer mode (DTM) (e.g., provision of CS and PS services simultaneously) is not supported in a target GERAN, there may be different options for moving UE 110 back to source E-UTRAN 505 depending on a mechanism (e.g. PS handover, blind PS handover, CCO, or redirect at release) used to move UE 110 to source E-UTRAN 505. If redirect at release is used, the target GERAN may select and indicate a source E-UTRAN 505 cell in a channel release message, and UE 110 may instantly move to the selected cell. If any of the other mechanisms are used, there may be two options. If existing standardized mechanisms are used, a CS connection may first be released, UE 110 may be brought to a PS active state, and the PS handover, blind PS handover, or CCO may be triggered. Another option may include triggering the PS handover, blind PS handover, or CCO over the CS connection (e.g., in combination with the channel release message).

If DTM is supported in target UTRAN/GERAN 515, a RNC (or BSC) of target UTRAN/GERAN 515 may continue with the release of the CS connection and may use the release as an indication to trigger moving UE 110 back to source E-UTRAN 505 (e.g., to instantly trigger PS handover, blind PS HO, or CCO to source E-UTRAN 505).

In both DTM situations, the BSC/RNC of target UTRAN/GERAN 515 may select an appropriate source E-UTRAN 505 cell for UE 110, and may command UE 110 to move back to the selected source E-UTRAN 505 cell. The selection of the source E-UTRAN 505 cell may be based on the following principles. If target UTRAN/GERAN 515 can determine that UE 110 has not physically moved around in target UTRAN/GERAN 515 during the CS service, a blind PS handover may be triggered back to the source E-UTRAN 505 cell. This same principle may be used for CCO. Target UTRAN/GERAN 515 may also configure UE 110 for Inter-Radio Access Technology (IRAT) source E-UTRAN 505 measurements, and may select the source E-UTRAN 505 cell based on the received measurements. In this case, target UTRAN/GERAN 515 may dynamically build neighboring source cell relations during a PS handover preparation phase.

Although FIG. 5 shows exemplary components of network 500, in other embodiments, network 500 may contain fewer components, different components, differently arranged components, or additional components than depicted in FIG. 5. Additionally or alternatively, one or more components of network 500 may perform one or more other tasks described as being performed by one or more other components of network 500.

Figure 6:
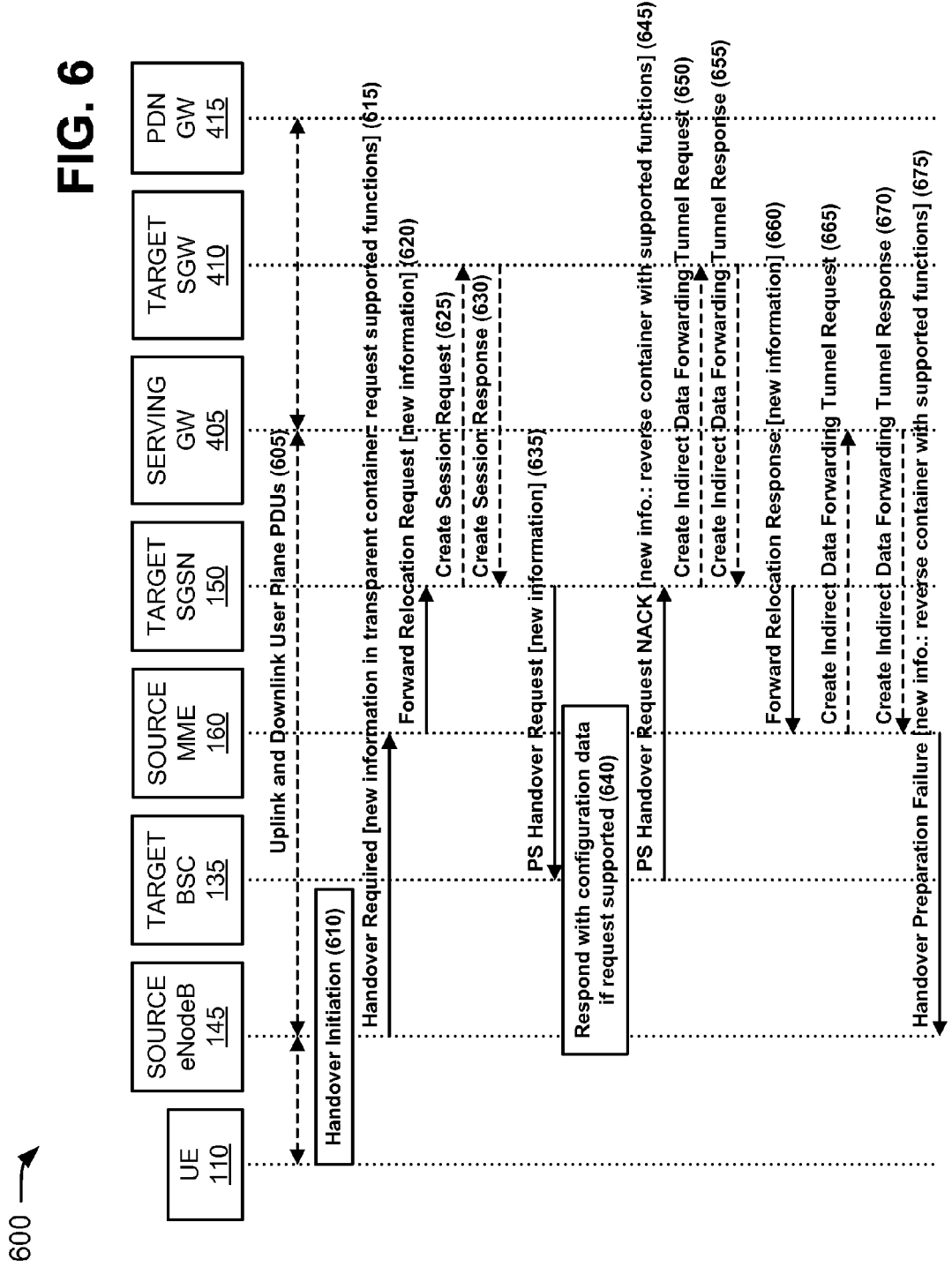
FIG. 6 is a diagram of additional exemplary interactions among components of the exemplary network depicted in FIG. 4.

FIG. 6 is a diagram of additional exemplary interactions among components of an exemplary network 600. As shown, network 600 may include the same components as network 400 (FIG. 4), and may include the features described above in connection with FIG. 4. In an exemplary embodiment, FIG. 6 may depict how a PS handover preparation phase is modified when PS handover is used by a self organizing network (SON) to provide supported functions (e.g., about a target radio access network) to a source radio access network. In FIG. 6, GERAN 130 (e.g., BSC 135) is used as the exemplary target radio access network. However, the same principles may apply when UTRAN 120 is used as the exemplary target radio access network.

As further shown in FIG. 6, uplink and downlink user plane PDUs may be exchanged among UE 110, eNodeB 145, serving GW 405, and PDN GW 415, as indicated by reference number 605. While associated with a source radio access network (e.g., E-UTRAN 140), eNodeB 145 may initiate a handover of UE 110, as indicated by reference number 610, in order to receive supported functions associated with a target radio access network (e.g., UTRAN 120 or GERAN 130). Source eNodeB 145 may add new information about the supported functions to a handover required message 615, and may provide handover required message 615 to source MME 160. The new information (e.g., about the supported functions) may be transported transparently to a target radio access network (e.g., to BSC 135 of GERAN 130), and may be included in RAN transparent containers. The RAN transparent containers may include specific information elements (IEs) that are transported unmodified between a source radio access network (e.g., E-UTRAN 140) and a target radio access network (e.g., GERAN 130).

In one exemplary embodiment, the new information (e.g., about the supported functions) may include information about functions (or sub-functions) supported by a target radio access network (e.g., UTRAN 120 or GERAN 130). Such functions may include a latest 3GPP release supported by the target radio access network, whether the target radio access network supports Automatic Neighbor cell Relation (ANR), whether the target radio access network supports Single Radio Voice Call Continuity (SRVCC), etc. The new information may be obtained by piggybacking to a regular handover attempt or by piggybacking to a function probing attempt. Piggybacking to a regular handover attempt may permit an immediate attempt at obtaining the new information. Piggybacking to a function probing attempt may require that a core network be informed that resources should not be allocated. Instead of using regular function signaling to identify supported functions and sub-functions (e.g., the new information), in one exemplary embodiment, a RIM framework may be extended with a feature request mechanism that enables information sharing separate from the function signaling.

As further shown in FIG. 6, source MME 160 may provide a forward relocation request message 620 (e.g., that includes the new information) to target SGSN 150. Target SGSN 150 may provide a create session request message 625 to target SGW 410, and may receive a create session response message 630 from target SGW 410. Target SGSN 150 may provide a PS handover request message 635 (e.g., that includes the new information) to target BSC 135 (e.g., since GERAN 130 is the selected target radio access network from which to query supported functions). Target BSC 135 may respond with configuration data for the request (e.g., for the supported functions), as indicated by reference number 640. If the request is not supported, target BSC 135 may not respond. Target BSC 135 may provide a PS handover request acknowledge (NACK) message 645 (e.g., that includes a reverse container with supported functions) to target SGSN 150. The reverse container may include information, such as a latest 3GPP release supported by target BSC 135, related CS fallback functions, etc.

Target SGSN 150 may provide a create indirect data forwarding tunnel request 650 to target SGW 410, and may receive a create indirect data forwarding tunnel response 655 from target SGW 410. Target SGSN 150 may then provide a forward relocation response 660 to source MME 160. Source MME 160 may provide a create indirect data forwarding tunnel request 665 to serving GW 405, and may receive a create indirect data forwarding tunnel response 670 from serving GW 405. Source MME 160 may provide a handover preparation failure message 675 (e.g., that includes the reverse container with supported functions) to source eNodeB 145.

Although FIG. 6 shows exemplary components of network 600, in other embodiments, network 600 may contain fewer components, different components, differently arranged components, or additional components than depicted in FIG. 6. Additionally or alternatively, one or more components of network 400 may perform one or more other tasks described as being performed by one or more other components of network 600.

FIGS. 7-11 depict flow charts of an exemplary process 700 for returning a UE to a source radio access network after receiving a service via a target radio access network according to embodiments described herein. In one embodiment, process 700 may be performed by one of RNC 125 or BSC 135. In other embodiments, some or all of process 700 may be performed by another device or group of devices (e.g., communicating with one of RNC 125 or BSC 135).

Figure 7:
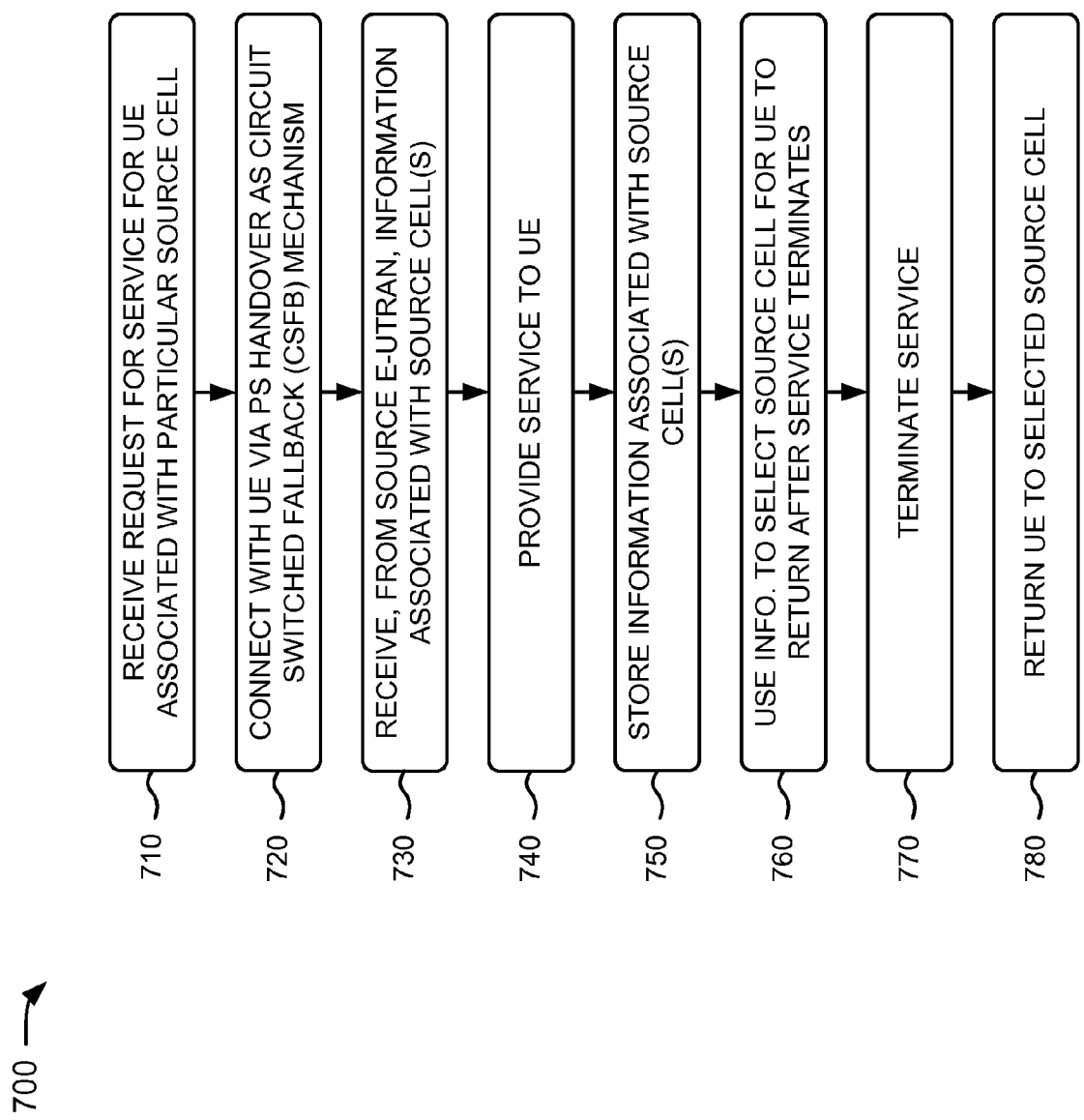

As illustrated in FIG. 7, process 700 may include receiving a request for a service for a UE associated with a particular source cell (block 710), and connecting with the UE via a PS handover as a circuit switched fallback mechanism (block 720). For example, in embodiments described above in connection with FIG. 5, UE 110 may be in active mode 520 (e.g., may be communicating) with a source cell (e.g., source cell 510-1) of source E-UTRAN 505, and a service (e.g., a CS service, such as a CS call) may be triggered for UE 110, as indicated by reference number 525. In one example, the triggered service may include a service provided by a target radio access network (e.g., target UTRAN/GERAN 515). Based on the triggered service, UE 110 may indicate a need for a CS service to eNodeB 145 which may trigger moving of UE 110 to target UTRAN/GERAN 515, and target UTRAN/GERAN 515 (e.g., RNC 125 or BSC 135) may receive the request to move UE 110. UE 110 may move 530 to (e.g., connect with) target UTRAN/GERAN 515 via a PS handover as a CS fallback mechanism.

As further shown in FIG. 7, process 700 may include receiving, from a source E-UTRAN, information associated with one or more source cells (block 730), providing the service to the UE (block 740), and storing the information associated with the source cell(s) (block 750). For example, in embodiments described above in connection with FIG. 5, when UE 110 moves to target UTRAN/GERAN 515, UE 110 may receive the CS service (e.g., a CS call may established with UE 110) via target UTRAN/GERAN 515. During (or via) the PS handover to target UTRAN/GERAN 515, source E-UTRAN 505 may provide information 535 to target UTRAN/GERAN 515. Information 535 may include frequencies associated with source cells 510-1 through 510-N, physical cell identities (PCIs) associated with source cells 510-1 through 510-N, identifications of eNodeBs (e.g., eNodeB 145) or NodeBs serving source cells 510-1 through 510-N, and tracking area identities (TAIs) associated with source cells 510-1 through 510-N. Target UTRAN/GERAN 515 may store information 535.

Returning to FIG. 7, process 700 may include using the information to select a source cell for the UE to return after the service terminates (block 760), terminating the service (block 770), and returning the UE to the selected source cell (block 780). For example, in embodiments described above in connection with FIG. 5, when the CS Service is about to be terminated (e.g., as indicated by reference number 550), target UTRAN/GERAN 515 may use information 535 (e.g., about the CS fallback procedure being in process) to decide how to move UE 110 back to source E-UTRAN 505 as soon as possible. Target UTRAN/GERAN 515 may use information 535 to select one of source cells 510-1 through 510-N for UE 110 to return after the CS service terminates, and may provide information 555 about the selected one of source cells 510-1 through 510-N to UE 110. Information 555 may direct UE 110 to move 560 to one of source cells 510-1 through 510-N. The CS service may terminate for UE 110, and UE 110 may return to the selected one of source cells 510-1 through 510-N. In one example, after target UTRAN/GERAN 515 has selected the source E-UTRAN 505 cell, a PS handover or CCO procedure may be used to move UE 110 back to source E-UTRAN 505.

Figure 8:
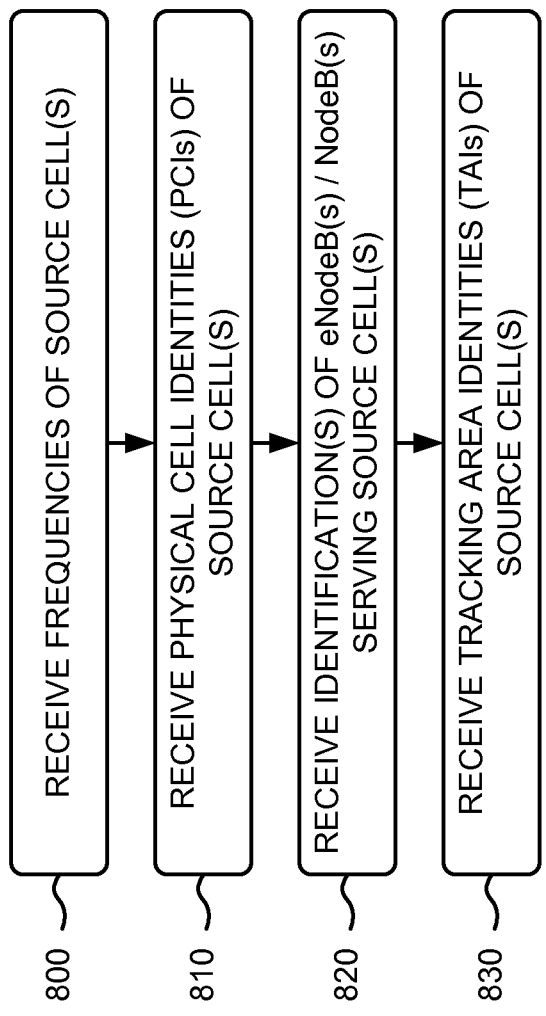

Process block 730 may include the process blocks depicted in FIG. 8. As illustrated in FIG. 8, process block 730 may include receiving frequencies of the source cell(s) (block 800), receiving physical cell identities (PCIs) of the source cell(s) (block 810), receiving identification(s) of eNodeB(s) or NodeB(s) serving the source cell(s) (block 820), and receiving tracking area identities (TAIs) of the source cell(s) (block 830). For example, in embodiments described above in connection with FIG. 5, during (or via) the PS handover to target UTRAN/GERAN 515, source E-UTRAN 505 may provide information 535 to target UTRAN/GERAN 515. Information 535 may include frequencies associated with source cells 510-1 through 510-N, physical cell identities (PCIs) associated with source cells 510-1 through 510-N, identifications of eNodeBs (e.g., eNodeB 145) or NodeBs serving source cells 510-1 through 510-N, and tracking area identities (TAIs) associated with source cells 510-1 through 510-N. Information 535 may also include identifications of one or more source cells 510-1 through 510-N (e.g., source E-UTRAN cells).

Figure 9:
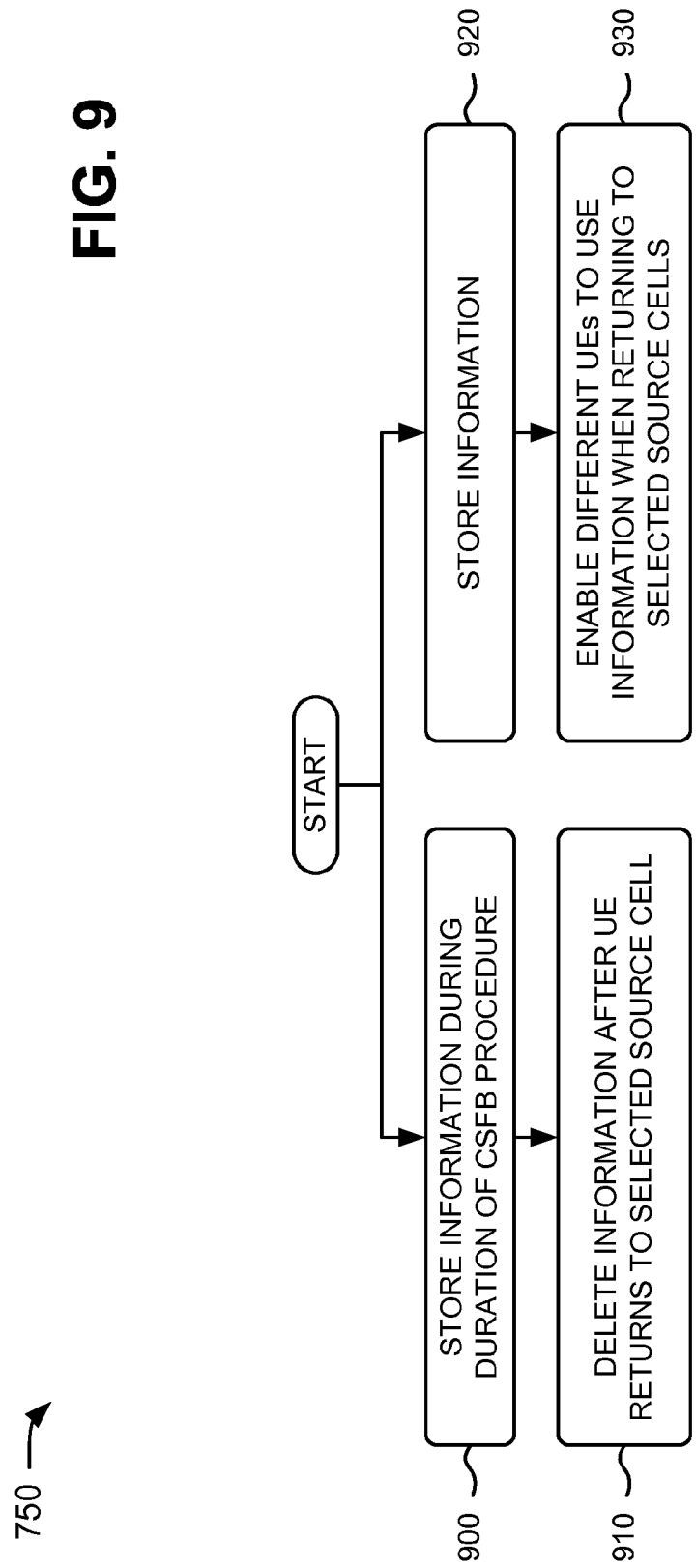

Process block 750 may include the process blocks depicted in FIG. 9. As illustrated in FIG. 9, process block 750 may include storing the information during the duration of the CS fallback procedure (block 900) and deleting the information after the UE returns to the selected source cell (block 910). For example, in embodiments described above in connection with FIG. 5, target UTRAN/GERAN 515 may store information 535 only during a duration of the CS fallback procedure (e.g., as indicated by reference number 540), and may delete information 535 after UE 110 has returned to source E-UTRAN 505. This approach may work when UE 110 does not physically move a lot in target UTRAN/GERAN 515 during provision of the CS service since one of source cells 510-1 through 510-N may still be a viable source E-UTRAN 505 cell to which UE 110 may return.

As further shown in FIG. 9, process block 750 may, alternatively, include storing the information (block 920), and enabling different UEs to use the information when returning to selected source cells (block 930). For example, in embodiments described above in connection with FIG. 5, if UE 110 physically moves around a lot (e.g., between BSCs or RNCs) in target UTRAN/GERAN 515 during provision of the CS service, information 535 may become outdated. In such a situation, target UTRAN/GERAN 515 may store information 535 associated with neighboring source cells (e.g., neighbor cells to source cells 510-1 through 510-N). In this case, information 535 may be stored more permanently (e.g., after the duration of the CS fallback procedure, after UE 110 has returned to source E-UTRAN 505, when target UTRAN/GERAN 515 receives information 535, etc.) in target UTRAN/GERAN 515, as indicated by reference number 545. Such information 535 may be used by other UEs 110 when the other UEs 110 are to be returned to source E-UTRAN 505 from target UTRAN/GERAN 515.

Figure 10:
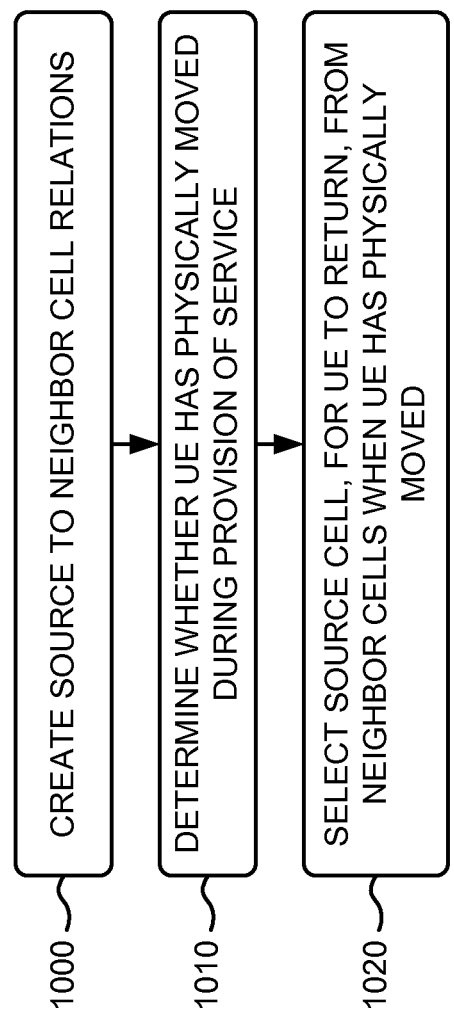

Process block 760 may include the process blocks depicted in FIG. 10. As illustrated in FIG. 10, process block 760 may include creating source to neighbor cell relations (block 1000), determining whether the UE has physically moved during provision of the service (block 1010), and selecting the source cell, for the UE to return, from neighbor cells when UE has physically moved (block 1020). For example, in embodiments described above in connection with FIG. 5, if target UTRAN/GERAN 515 determines that UE 110 physically moves around a lot (e.g., between BSCs or RNCs) in target UTRAN/GERAN 515 during provision of the CS service, target UTRAN/GERAN 515 may store information 535 associated with neighboring source cells (e.g., neighbor cells to source cells 510-1 through 510-N). This approach may solve the problem of UE 110 physically moving during provision of the CS service. In one example, target UTRAN/GERAN 515 may store information associated with the neighboring source cells of source E-UTRAN 505 as neighbor cell relations for target UTRAN/GERAN 515. Such information may include a "cell type" indicator that may enable target UTRAN/GERAN 515 to estimate a validity time for the information. When target UTRAN/GERAN 515 determines that UE 110 physically moves, target UTRAN/GERAN 515 may select the source cell (e.g., for UE 110 to return) from the neighboring source cells of source E-UTRAN 515 (e.g., based on information 535 associated with neighbor cells to source cells 510-1 through 510-N).

Process block 780 may include the process blocks depicted in FIG. 11. As illustrated in FIG. 11, process block 780 may include one of returning the UE to the selected source cell based on a PS handover (block 1100), returning the UE to the selected source cell based on a blind PS handover (block 1110), returning the UE to the selected source cell based on a cell change order (block 1120), or returning the UE to the selected source cell based on a redirect at release (block 1130). For example, in embodiments described above in connection with FIG. 5, after target UTRAN/GERAN 515 has selected the source E-UTRAN 505 cell, a PS handover, a blind PS handover, a CCO, or a redirect at release procedure may be used to move UE 110 back to source E-UTRAN 505.

Systems and/or methods described herein may enable a source radio access network (e.g., a E-UTRAN) to provide information about a source E-UTRAN cell to a target radio access network (e.g., either a GERAN or a UTRAN) during a PS handover preparation phase for CS fallback. The target radio access network (e.g., based on the received information) may use the source cell as a first candidate for moving a UE back to the E-UTRAN after a CS service terminates in the GERAN or UTRAN. The UE may move back to the E-UTRAN based on, for example, PS handover, blind PS handover, a Cell Change Order (CCO), or a redirect at release. The GERAN or UTRAN may select a cell from the E-UTRAN (e.g., for the UE) to which the UE may return after the CS service terminates. The received information about the source (e.g., the E-UTRAN) cell may include information necessary for the GERAN or UTRAN to trigger the PS handover, the blind PS handover, and/or the CCO. In addition, the systems and/or methods described herein may enable the target radio access network (e.g., the GERAN or UTRAN) to build source to neighbor cell relations that may be used if the user equipment has physically moved in the GERAN or UTRAN during the CS service or if radio conditions have changed in such a way that another E-UTRAN cell should be selected for the user equipment.

The foregoing description of embodiments provides illustration and description, but is not intended to be exhaustive or to limit the invention to the precise form disclosed. Modifications and variations are possible in light of the above teachings or may be acquired from practice of the invention.

For example, while embodiments described herein relate to a E-UTRAN as a source radio access network, embodiments described herein may also be applied to situations where a UTRAN is the source radio access network. Furthermore, the CS fallback procedure described herein may also be applied to situations where a "PS-only" UTRAN is the source radio access network and a GERAN or a "normal" UTRAN is the target radio access network.

In another example, while series of blocks have been described with regard to FIGS. 7-11, the order of the blocks may be modified in other embodiments. Further, non-dependent blocks may be performed in parallel.

It should be emphasized that the term "comprises/comprising" when used in this specification is taken to specify the presence of stated features, integers, steps or components but does not preclude the presence or addition of one or more other features, integers, steps, components or groups thereof.

It will be apparent that exemplary aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method in a target radio access network that includes a device, the method comprising:
   receiving, by the device, a request for a service for a user equipment associated with a particular source cell of a source radio access network;
   connecting, by the device, with the user equipment via a handover procedure;
   receiving, by the device and from the source radio access network, information associated with one or more source cells that include the particular source cell;
   providing, by the device, the service to the user equipment via the target radio access network;
   using, by the device, the information to select one of the one or more source cells for the user equipment to return after the service terminates;
   terminating the service;
   returning, by the device, the user equipment to the selected source cell; storing the information during a duration of the handover procedure; and deleting the information after the user equipment returns to the selected source cell.

2. The method of claim 1, where the device includes one of a radio network controller (RNC) or a base station controller (BSC).

3. The method of claim 1, where receiving information associated with one or more source cells includes:
   receiving frequencies of the one or more source cells,
   receiving physical cell identities of the one or more source cells,
   receiving identifications of eNodeBs serving the one or more source cells,
   receiving identifications of one or more source E-UTRAN cells, and
   receiving tracking area identities of the one or more source cells.

4. The method of claim 1, where receiving information associated with one or more source cells includes:
   receiving frequencies of the one or more source cells,
   receiving physical scrambling codes of the one or more source cells,
   receiving identifications of RNCs serving the one or more source cells,
   receiving identifications of one or more source UTRAN cells, and
   receiving routing area identities of the one or more source cells.

5. The method of claim 1, where the handover procedure includes a circuit switched fallback procedure.

6. The method of claim 1, further comprising:
   enabling multiple user equipment to use the information when returning to selected source cells.

7. A method in a target radio access network that includes a device, the method comprising: receiving, by the device, a request for a service for a user equipment associated with a particular source cell of a source radio access network; connecting, by the device, with the user equipment via a handover procedure; receiving, by the device and from the source radio access network, information associated with one or more source cells that include the particular source cell; using, by the device, the information to select one of the one or more source cells for the user equipment to return after the service terminates, wherein using the information includes:
   creating source to neighbor cell relations based on the information,
   determining whether the user equipment has physically moved during provision of the service, and
   selecting a source cell, for the user equipment to return, from neighbor cells when the user equipment has physically moved.

8. The method of claim 1, where returning the user equipment to the selected source cell includes one of:
   returning the user equipment to the selected source cell based on a packet switched handover,
   returning the user equipment to the selected source cell based on a blind packet switched handover,
   returning the user equipment to the selected source cell based on a cell change order, or
   returning the user equipment to the selected source cell based on a redirect at release.

9. The method of claim 8, where the information is used by the device to trigger one of the packet switched handover, the blind packet switched handover, the cell change order, or the redirect at release.

10. The method of claim 1, further comprising:
    using the particular source cell as a first candidate for the user equipment to return after the service terminates.

11. The method of claim 1, where the handover procedure includes a packet switched handover procedure.

12. A device in a target radio access network, the device comprising:
    a memory to store a plurality of instructions; and
    a processor to execute instructions in the memory to:
       receive a request for a service for a user equipment associated with a source radio access network,
       establish a connection with the user equipment via a handover procedure,
       receive, from the source radio access network, information associated with one or more source cells,
       provide the service to the user equipment through the target radio access network,
       use the information to select one of the one or more source cells for the user equipment to return after the service terminates,
       terminate the service,
       return the user equipment to the selected source cell; storing the information during a duration of the handover procedure; and deleting the information after the user equipment returns to the selected source cell.

13. The device of claim 12, where the device includes one of a radio network controller (RNC) or a base station controller (BSC).

14. The device of claim 12, where the target radio access network includes one of a UMTS Terrestrial Radio Access Network (UTRAN) or a GSM EDGE Radio Access Network (GERAN), and where the source radio access network includes one of an Evolved UTRAN (E-UTRAN) or a UTRAN.

15. The device of claim 12, where the information associated with the one or more source cells includes one or more of:
    frequencies of the one or more source cells,
    physical cell identities of the one or more source cells,
    identifications of eNodeBs serving the one or more source cells,
    identifications of one or more source E-UTRAN cells, or
    tracking area identities of the one or more source cells.

16. The device of claim 12, where, when storing the information, the processor is further to execute instructions in the memory to:
- store the information after the user equipment returns to the selected source cell, and
- provide the information to multiple user equipment to use when returning to selected source cells.

17. A device in a target radio access network, the device comprising: a memory to store a plurality of instructions; and a processor to execute instructions in the memory to: receive a request for a service for a user equipment associated with a source radio access network; establish a connection with the user equipment via a handover procedure; receive, from the source radio access network, information associated with one or more source cells; and use the information to select one of the one or more source cells for the user equipment to return after the service terminates, wherein, when using the information, the processor is further to execute instructions in the memory to:
- create source to neighbor cell relations based on the information,
- determine whether the user equipment has physically moved during provision of the service, and
- select a source cell, for the user equipment to return, from neighbor source cells when the user equipment has physically moved.

18. The device of claim 12, where, when returning the user equipment to the selected source cell, the processor is further to execute instructions in the memory to one of:
- return the user equipment to the selected source cell based on a packet switched handover,
- return the user equipment to the selected source cell based on a blind packet switched handover,
- return the user equipment to the selected source cell based on a cell change order, or
- return the user equipment to the selected source cell based on a redirect at release.

19. The method of claim 10, further comprising:
- creating source to neighbor cell relations based on the information;
- determining whether the user equipment has physically moved during provision of the service;
- determining whether the first candidate source cell is available for the user equipment to return;
- in response to the first candidate being available for return, selecting the first candidate source cell for the user equipment to return when the user equipment has physically moved; and
- in response to the first candidate not being available for return, selecting a source cell based on the source to neighbor cell relations for the user equipment to return when the user equipment has physically moved.

* * * * *

UNITED STATES PATENT AND TRADEMARK OFFICE
CERTIFICATE OF CORRECTION

PATENT NO. : 8,600,390 B2  
APPLICATION NO. : 12/698335  
DATED : December 3, 2013  
INVENTOR(S) : Vikberg et al.

Page 1 of 1

It is certified that error appears in the above-identified patent and that said Letters Patent is hereby corrected as shown below:

On the Title Page, item (73), under "Assignee", in Column 1, Line 1, delete "Telefonaktiebolet" and insert -- Telefonaktiebolaget --, therefor.

Signed and Sealed this
Twenty-ninth Day of July, 2014

Michelle K. Lee
*Deputy Director of the United States Patent and Trademark Office*